Sept. 2, 1930. A. TROSCH 1,775,006
MACHINE TOOL
Filed Aug. 10, 1927 7 Sheets-Sheet 2

INVENTOR
Alfred Trosch
BY Harold E. Stonebraker
his ATTORNEY

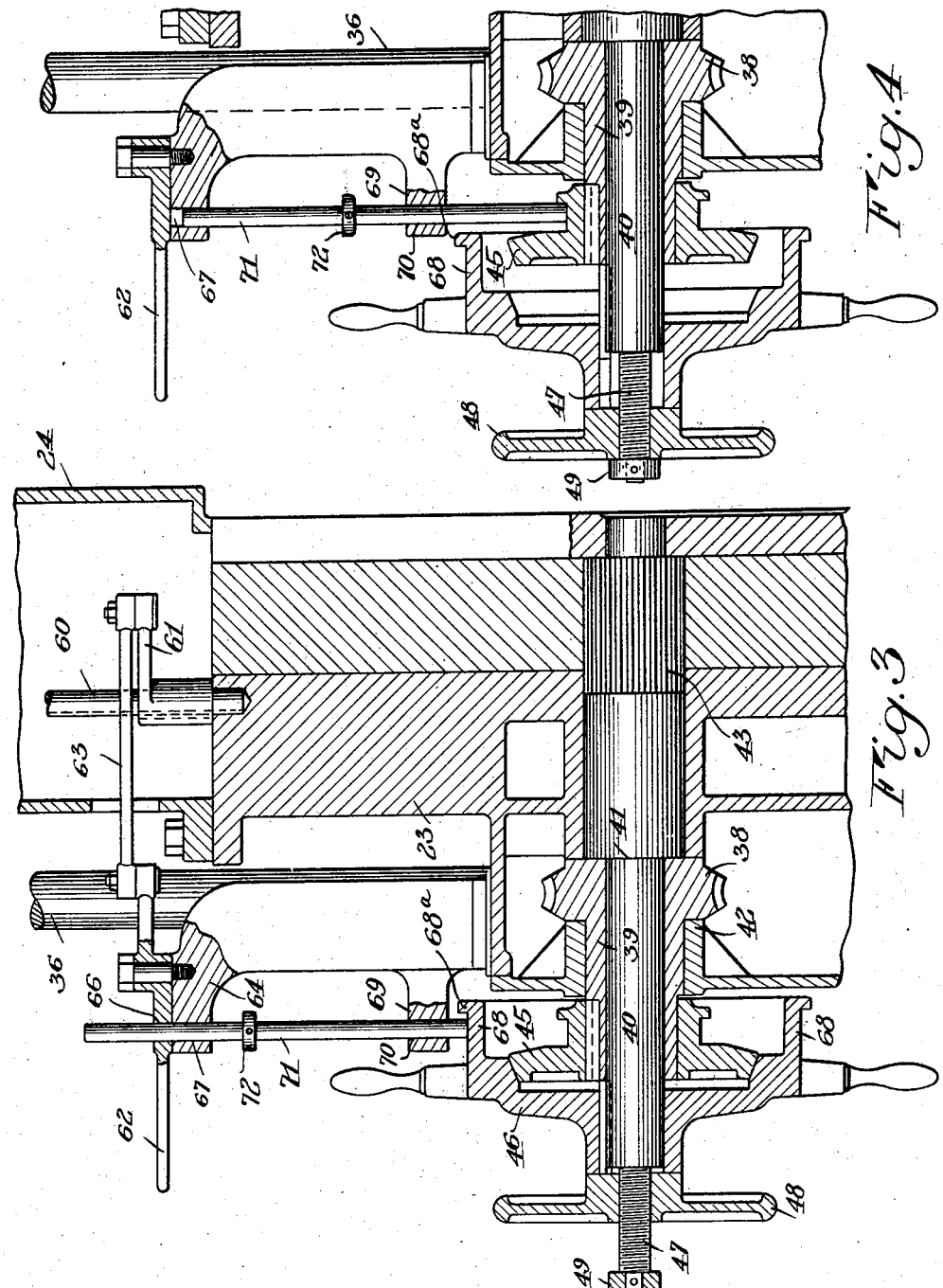

Sept. 2, 1930.  A. TROSCH  1,775,006
MACHINE TOOL
Filed Aug. 10, 1927   7 Sheets-Sheet 4
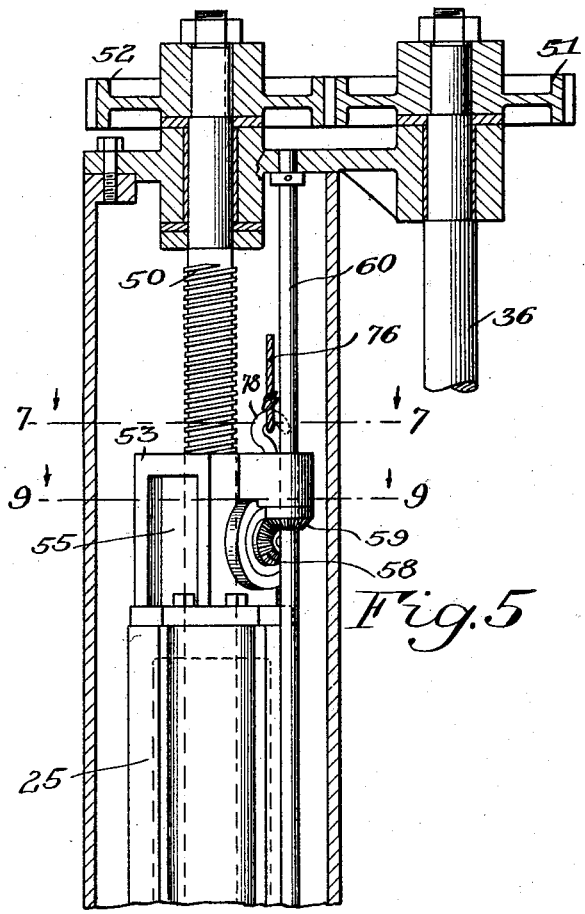
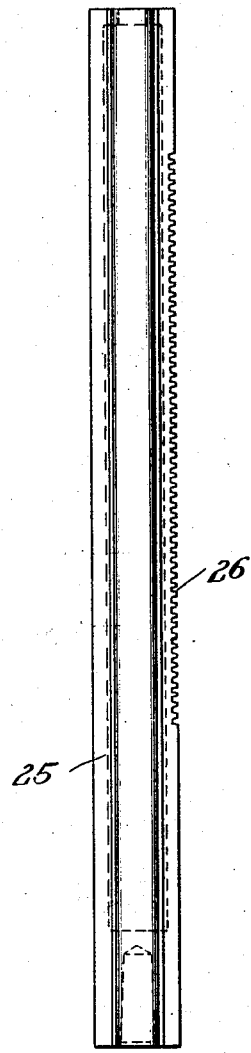
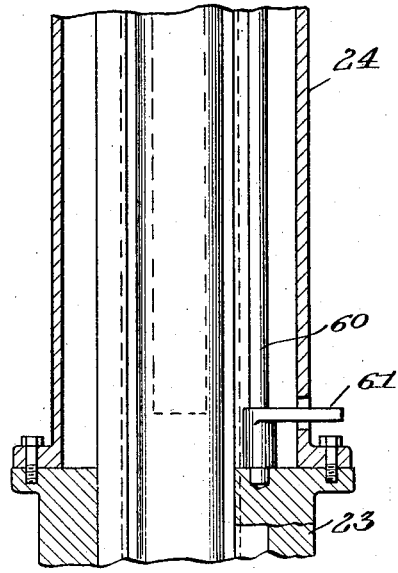
INVENTOR
*Alfred Trosch*
BY *Harold E. Stonebraker*
*his* ATTORNEY Sept. 2, 1930.  A. TROSCH  1,775,006

MACHINE TOOL

Filed Aug. 10, 1927    7 Sheets-Sheet 5

INVENTOR
*Alfred Trosch*
BY
*Harold R. Stonebraker*
his ATTORNEY

INVENTOR
Alfred Trosch
BY Harold E. Stonebraker
his ATTORNEY

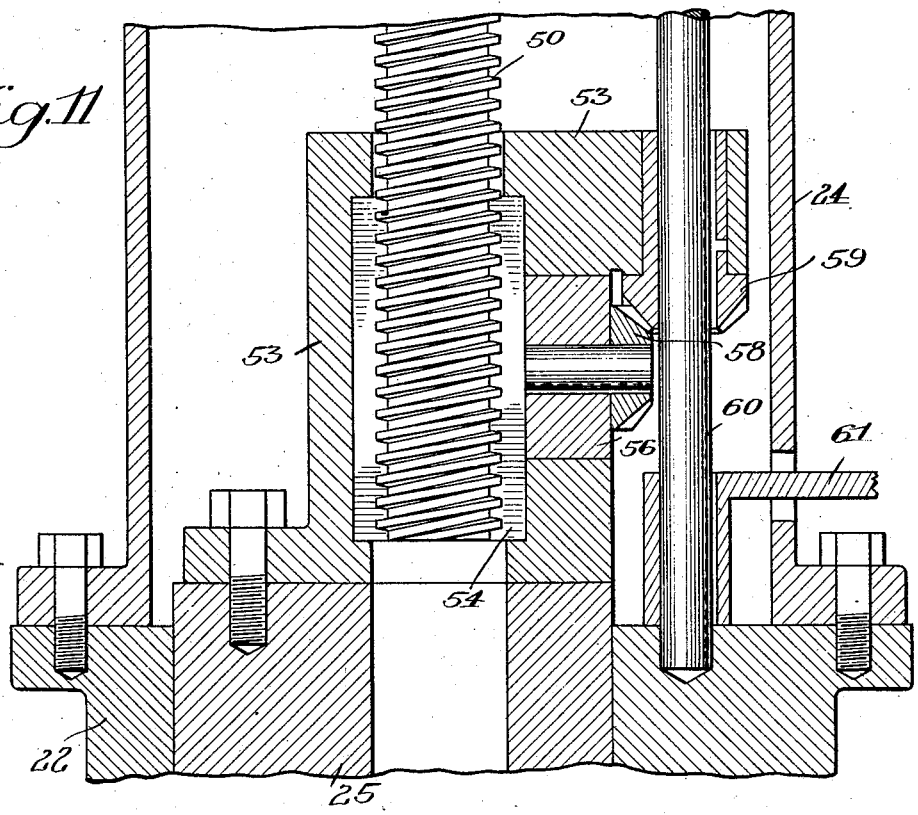
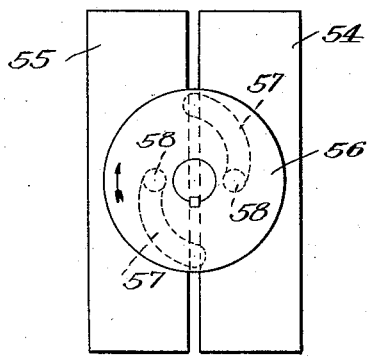
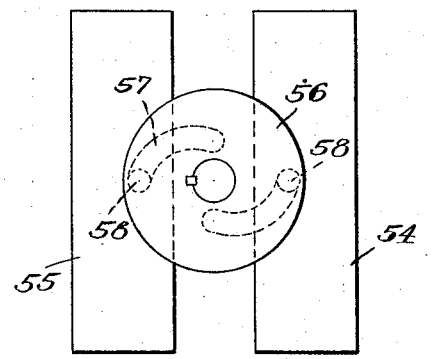

Patented Sept. 2, 1930

1,775,006

UNITED STATES PATENT OFFICE

ALFRED TROSCH, OF ROCHESTER, NEW YORK, ASSIGNOR TO CONSOLIDATED MACHINE TOOL CORPORATION OF AMERICA, OF ROCHESTER, NEW YORK, A CORPORATION OF DELAWARE

MACHINE TOOL

Application filed August 10, 1927. Serial No. 212,041.

This invention relates to a machine tool with particular reference to those of the boring machine type, and has for its principal object to provide such a machine with a simple and effective driving mechanism for the tool which will permit the machine to be used in cutting screw threads.

Another object of the invention is to provide a special and supplemental tool carrier drive for use only in cutting threads so that this drive will not be subjected to wear during other operations.

A further object of the invention is to provide mechanism which may be operated easily for making the screw cutting drive or the regular drive effective at will.

Still another object is to provide interlocking mechanism so that the special drive cannot be made effective unless the regular drive is ineffective and vice versa.

With these and other ends in view, the invention comprises the structure and combination of parts which will appear more clearly from the following description when read in conjunction with the accompanying drawings, the novel features being pointed out in the claims following the description.

In the drawings:

Figure 3 is a vertical section through a part of the regular drive showing the clutch in closed position and illustrating the interlocking mechanism between this drive and the special screw cutting drive;

Figure 4 is a view similar to Figure 3 showing the clutch in open position and the control handle for the screw cutting drive thrown to effective position;

Figure 5 is an elevation of a part of the tool carrier showing the screw drive therefor, parts being shown in section;

Figure 6 is an elevation of the tool carrier;

Figure 8 is a view similar to Figure 7 showing the clutch thrown out and the special drive thrown in;

Figure 11 is a vertical section taken approximately along the line 11—11 of Figure 9;

Figure 12 is a view of the operating cam for rendering the screw cutting drive effective or ineffective, showing it in its effective position.

Figure 13 is a view similar to Figure 12 showing the cam in its ineffective position, and Figure 14 is an elevation of one part of the split nut used in connection with the special drive.

Figure 1:
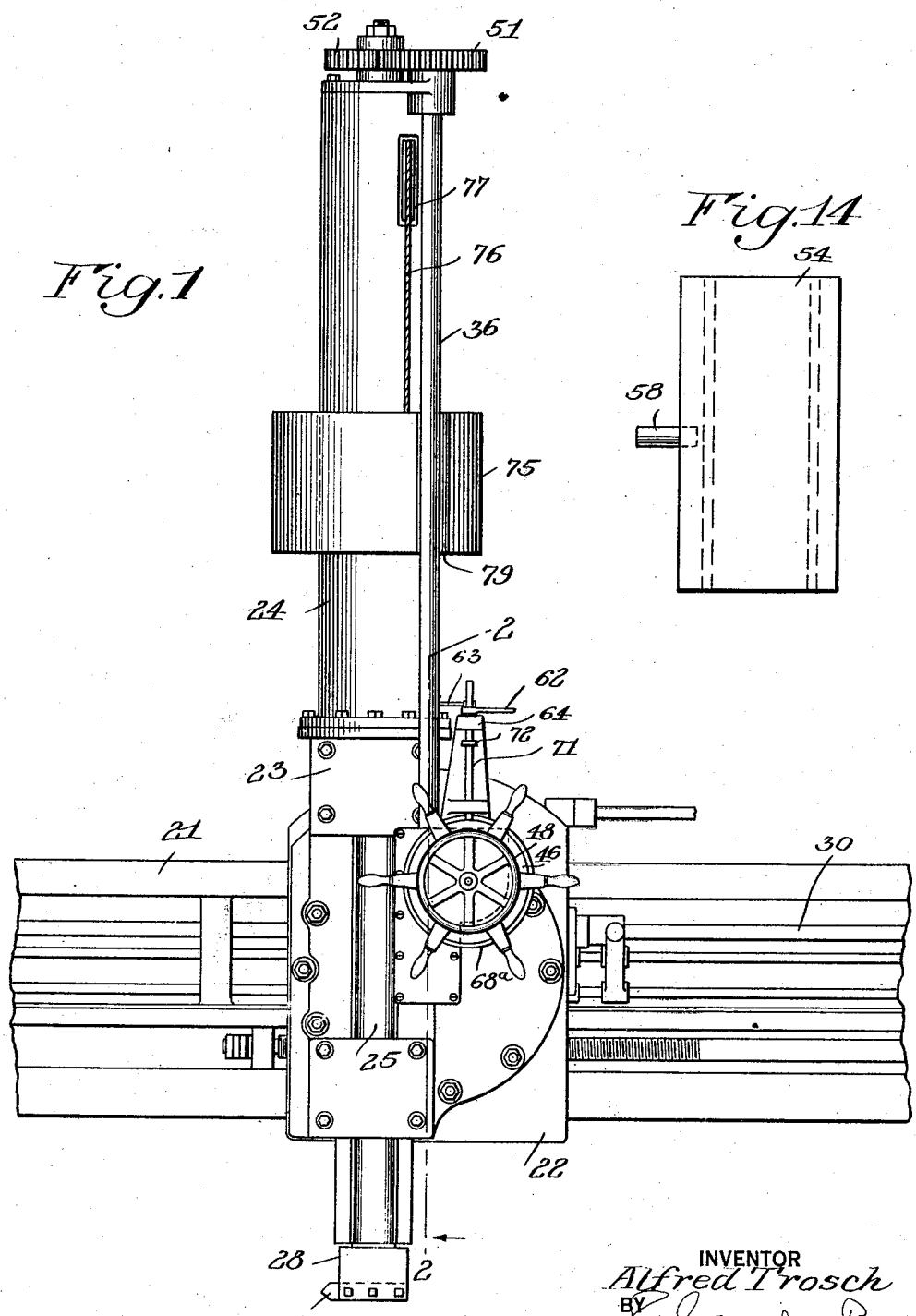
Figure 1 is a front elevation of a part of a boring machine having one possible embodiment of the invention applied thereto.

In boring machines of this general type, it has heretofore been customary to drive a tool carrier by means of a rack and pinion. While such a drive is satisfactory for ordinary operations, it is found to be unsuitable when it is desired to cut screw threads on the work being operated upon. This is due to the backlash inherent in a rack and pinion drive, especially when it becomes worn after continued use. With such a drive, the motion of the tool carrier is slightly irregular and the screw threads cut in such a manner will therefore not be true.

The present invention contemplates the provision of a special drive for use in cutting screw threads. This drive preferably comprises a long screw parallel to the carrier, and mechanism for effectively connecting the carrier to the screw so that the carrier will be driven when the screw is rotated. It is found that a screw drive of this kind is extremely accurate in cutting threads, as there is little or no lost motion between the screw and the nut travelling thereon. If the driving screw be cut accurately in the first place, it will furnish a satisfactory drive for thread cutting during any reasonable amount of use.

At the same time it is desirable to provide a machine not only with a screw drive, as above described, but also with the usual rack and pinion drive, the latter to be used during all operations other than thread cutting. If only a screw drive were provided for all operations, the wear upon such a drive would be considerable and eventually the screw and nut would be worn to such an extent that the carrier would no longer travel smoothly and cut true threads. Therefore, a duplex drive should be provided so that the rack and pinion will receive the wear incident to ordinary operations where the accuracy of a screw drive is not needed, and the screw drive will be used only in thread cutting or similar accurate operations, thus greatly prolonging its useful life.

If the machine be provided with a duplex drive, some interlocking mechanism must be used to prevent accidental use of both drives at the same time, which might seriously injure the machine. This invention therefore contemplates the provision of a suitable interlocking mechanism so arranged that the rack and pinion drive can be rendered effective only when the screw drive is ineffective, and vice versa.

Only a part of a boring machine is shown in the drawings, it being understood that the invention is applied to a conventional boring machine having a rotatable table and a suitable source of power for turning the table and driving the tool carrier. Above the table (not shown) is mounted the conventional cross-rail 21 having guide ways in which the tool head 22 may be adjusted in the conventional manner. Upon this head 22 is fixed the tool carrier housing, comprising a lower portion 23 and an upper portion 24. The tool carrier 25, having a rack 26 along one side thereof, as shown in Figure 6, is mounted for longitudinal movement within the housings 23 and 24. Suitable guiding surfaces are provided on the carrier, as at 27, and these cooperate with gibs within the housing 23 so that the carrier is held against transverse movement and guided accurately for longitudinal movement. The lower end of the carrier may have a conventional tool holder 28 attached thereto so that any suitable tool, such as 29, may be used.

The rack 26, above mentioned, may be driven in a number of ways. One possible form of driving mechanism comprises the shaft 30 which is driven in the well-known manner from the source of power, this shaft being so timed with relation to the table of the boring mill that it will make a predetermined number of revolutions during each revolution of the table. As is usual in such machines, a gear box may be employed so that the driving ratio between this shaft and the table may be varied at will.

Figure 2:
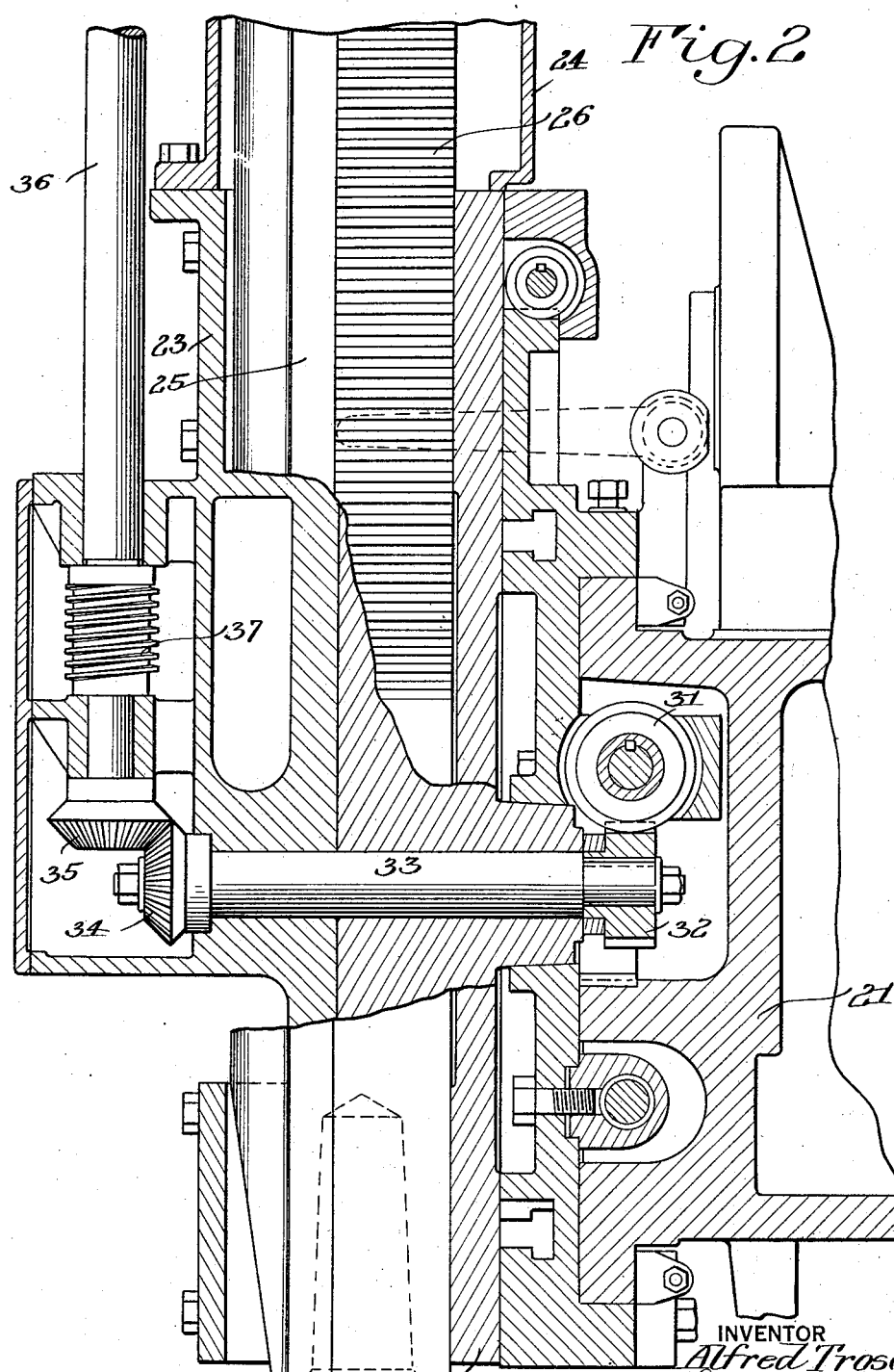
Figure 2 is a vertical sectional view through a part of the driving mechanism taken approximately along the line 2—2 of Figure 1.

On this driven shaft 30 is loosely keyed a spiral gear 31 arranged so that it may be moved longitudinally along the shaft when the tool head is adjusted to various positions along the rail 21. This spiral gear 31 drives a second spiral gear 32 fixed to a shaft 33 (Figure 2), on the other end of which is a bevel gear 34. This bevel gear drives another bevel gear 35 fixed to a shaft 36. This driven shaft 36 may be provided with a worm 37, shown in Figure 2, which meshes with a worm wheel 38 illustrated in Figures 3 and 4. This worm wheel 38 is preferably formed integral with a driven member in the form of a sleeve 39 rotatably mounted on a shaft 40. The worm wheel is held between a shoulder 41 on this shaft and a part 42 of the frame so as to prevent longitudinal movement of the sleeve relative to the shaft. The shaft 40 has a pinion 43 at one end thereof, the teeth of this pinion preferably being cut directly on the shaft. This pinion 43 meshes with an idler pinion 44 which in turn engages the rack 26 above described.

In order to drive the shaft 40 from the driven sleeve 39, any suitable clutch mechanism might be employed. Preferably, a member 45 is keyed to one end of the sleeve, this member being one part of a clutch, as clearly shown in Figures 3 and 4. A second clutch member 46, arranged to cooperate with the member 45, is loosely keyed on the shaft 40 so as to be capable of longitudinal movement relative to the shaft while at the same time having a rigid rotative connection therewith. It is apparent from Figure 3 that when the clutch member 46 is moved into cooperative relation with the member 45, the driven member 39 will be operatively connected to the shaft 40, and the motion of this driven member will be transmitted through the parts 45 and 46 to the shaft 40, thus rotating the pinions 43 and 44 and moving the tool carrier. In order to hold the clutch in closed position, various devices could be provided. One form of mechanism for accomplishing this comprises a screw 47 fixed to the end of the shaft 40 and a hand wheel 48 threaded on this screw and acting as a nut thereon. This hand wheel may be turned so as to force the clutch member 46 along the shaft 40 into engagement with the cooperating clutch member 45. A stop member 49 at the end of the screw 47 prevents the hand wheel 48 from being unscrewed so far as to fall off of the screw.

When it is desired to open the clutch 45, 46 to render the rack and pinion drive ineffective, the hand wheel 48 may be turned so as to move outwardly along the screw 47 and the clutch member 46 may then be slid a short distance along the shaft 40 until it is out of contact with member 45.

The special screw drive for the tool carrier may be constructed in a number of ways. In the embodiment illustrated in the drawings, the carrier is made hollow, as shown in Figures 5, 6 and 11, and a long screw 50 is rotatably mounted in suitable bearings at the top of the housing 24 and extends thence downward through the opening in the carrier 25. The driven shaft 36 above mentioned is extended upward as shown in Figures 1 and 5, and carries a spur gear 51 mounted thereon. This gear meshes with a similar gear 52 fixed to the screw 50, so that the screw is continuously rotated as long as the driven shaft 36 is turned.

Figure 9:
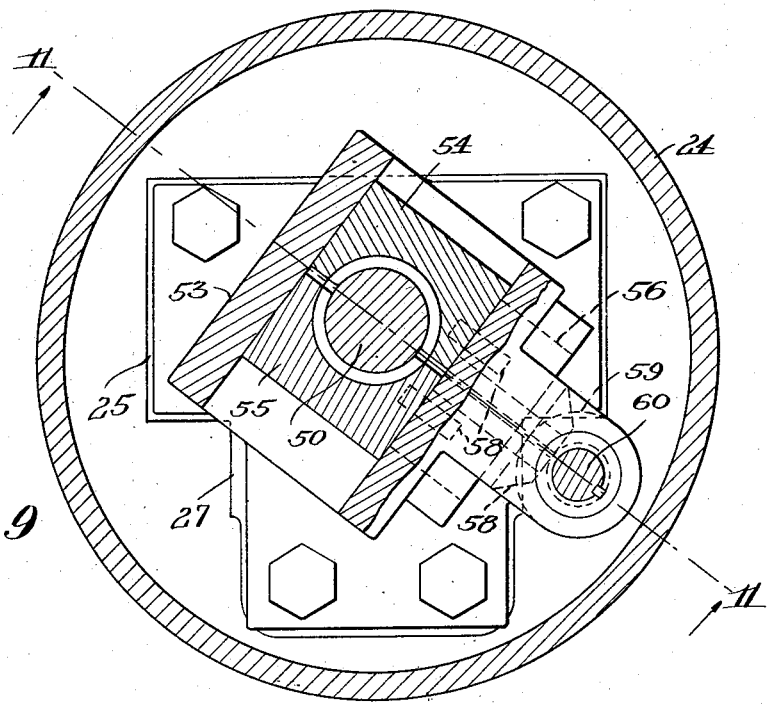
Figure 9 is a horizontal section taken approximately along the line 9—9 of Figure 5 and showing the special screw cutting drive in its effective position.

A number of mechanisms might be employed to establish a driving relation between the rotatable screw 50 and the tool carrier. One form of such mechanism comprises a housing 53 attached to the top of the carrier and having suitable transverse guideways formed therein. Slidably mounted in these guideways are members 54 and 55, together forming a split nut. These members may be moved toward each other until the threads on the members are in contact with the threads on the screw 50, this position being shown in Figure 9. The members 54, 55 will then act as a nut so that the rotation of the screw will cause this split nut to travel longitudinally along the screw. This longitudinal movement will be transmitted from the members 54, 55 to the housing 53 and thence to the tool carrier, thus resulting in longitudinal movement of the latter.

Figure 10:
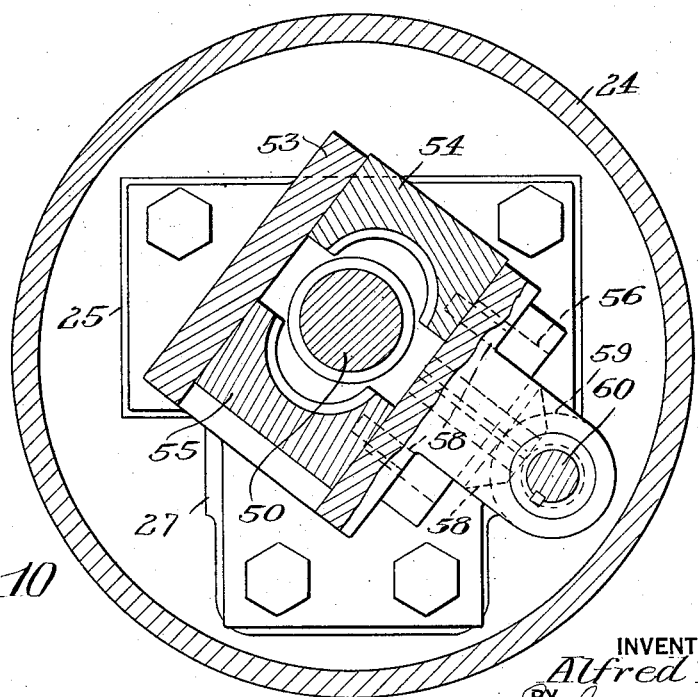
Figure 10 is a view similar to Figure 9 with the drive in its ineffective position.

When it is desired to render the screw drive ineffective, the members 54, 55 constituting the nut may be separated so as to be out of contact with the threads of the screw, this position being shown in Figure 10. When the parts are in this relationship, the screw 50 may continue to rotate without having any effect upon the split nut 54, 55 or upon the carrier.

One possible form of mechanism for moving the split nut 54, 55 from one position to the other, comprises the cam 56 shown in Figures 11, 12 and 13. This cam has a suitable bearing in the housing 53 and is provided on one face with the spiral cam grooves 57. Pins 58 set rigidly into the parts 54, 55 of the split nut project from the face of the nut, as shown in Figure 14, and extend into the cam grooves 51. Rotation of the cam in one direction will therefore tend to draw the pins 58 together, thus closing the nut, this position being illustrated in Figure 12. Rotation of the cam in the opposite direction will spread the pins apart and open the nut, as shown in Figure 13.

Figure 7:
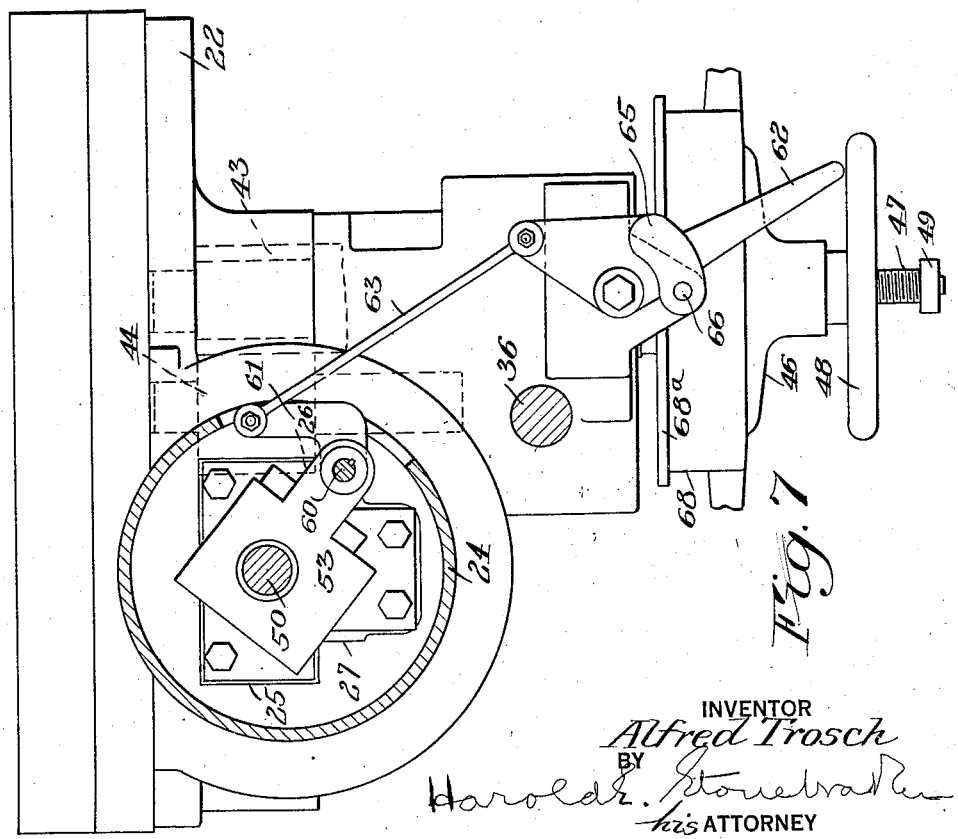
Figure 7 is a horizontal sectional view taken approximately on the line 7—7 of Figure 5 showing the clutch for the ordinary drive thrown in and the special screw cutting drive thrown out.

In order to oscillate the cam so as to move the split nut from effective to ineffective position, a bevel gear 58 may be fixed to the cam and may mesh with another bevel gear 59 loosely keyed upon a shaft 60 which extends parallel to the carrier 25, within the housing 24. This shaft 60 is illustrated in Figures 5 and 11. The bevel gear 59 is mounted in the housing 53 so as to be held against longitudinal movement therein but to be free for rotation. It will be understood that as the carrier 25 moves up or down during the operation of the machine, the bevel gear 59 moves correspondingly along the shaft 60, always maintaining a rigid rotative connection with that shaft by virtue of being loosely keyed thereon. Consequently, oscillation of the shaft 60 will turn the bevel gear 59 no matter in what position the carrier 25 may be situated, and thus the split nut may be engaged or disengaged with the screw 50 easily and quickly at any time, simply by turning the shaft 60. In order to turn this shaft, it may be provided with a crank arm 61 (see Figures 7, 8 and 11) fixed to it near its lower end.

Figure 8:
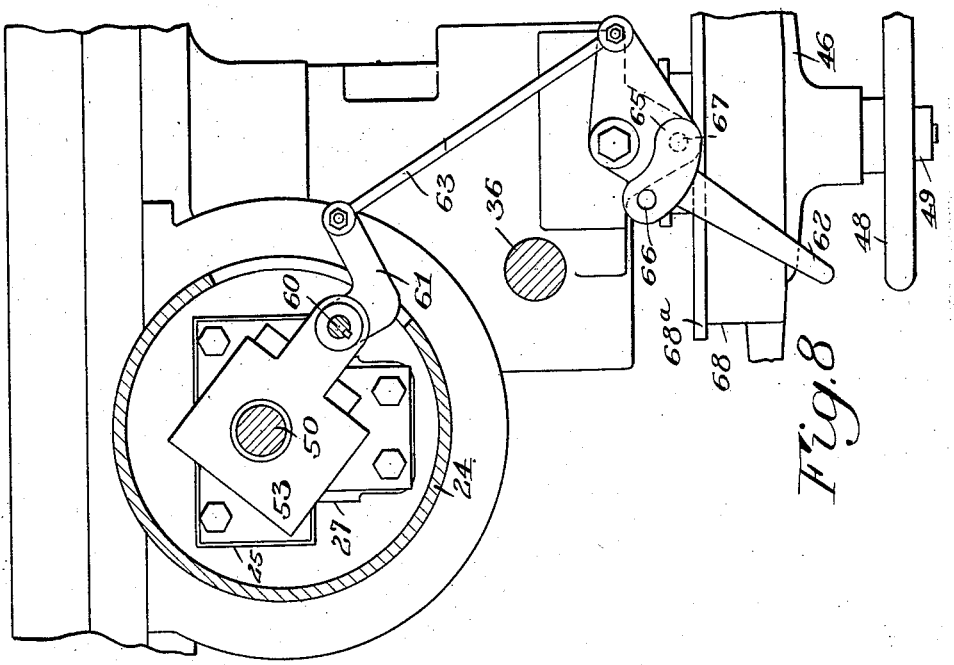

From the mechanism so far described, it will be apparent that the rack and pinion drive for the carrier may be rendered effective or ineffective at any time simply by turning the hand wheel 48 to tighten or loosen the clutch 45, 46, and the screw drive may likewise be rendered effective or ineffective simply by moving the lever 61 to turn the shaft 60. In order to prevent the possibility of the operator throwing both of the drives to effective position at the same time, there is employed interlocking mechanism which will now be described. This mechanism in one form comprises a lever 62, shown in Figures 3, 4, 7 and 8, which is connected by a link 63 to the crank 61. This lever 62 is placed in convenient position to be reached by the hand of the operator and is mounted upon a bracket 64. The lever is widened at one point so as to form a plate-like member 65 having a hole 66 therein. There is a corresponding hole 67 in the bracket 64, so positioned that it is in alinement with the hole 66 when the lever 62 is thrown to the position for disengaging the split nut from the screw, this relationship being shown in Figures 3 and 7. When the lever 62 is moved to its other position, however, so as to engage the split nut with the screw, the hole 66 is then no longer in alinement with the hole 67 but an unperforated portion of the plate 65 overlies the hole in the bracket. The parts when in this position are illustrated in Figures 4 and 8.

On the clutch member 46, above described, is an annular flange or rim 68 arranged as shown in Figures 3 and 4, and having a lip 68$^a$ at the edge thereof. A short distance above this rim is a bracket 69 having a hole 70 therein, this hole being in alinement with the hole 67. A rod 71 passes through the holes 67 and 70 and has a collar 72 thereon to prevent the rod from being removed from the machine.

It is apparent from an inspection of Figures 3 and 4 that when the clutch 45, 46 is in its closed position (Figure 3), the annular rim 68 is in alinement with the rod 71, and therefore the rod must be elevated so that it is out of the way of the lip 68ª before the clutch member 46 can be moved from alignment with the rod so that the rod can be moved to the Fig. 4 position to release the lever 62 and move into the path of the clutch member 46 and engage the clutch member 45. This rod cannot be elevated, however, unless the hole 66 is in alinement with the hole 67, which alinement takes place only when the split nut is in its ineffective position. The handle 62 must therefore be placed so as to render the screw drive ineffective before the clutch member 46 can be moved to the Figure 3 position to make the rack and pinion drive operative. Similarly, before the screw drive can be made effective, the clutch must first be disengaged and the member 46 must be pulled outward away from the member 45 sufficiently far so that the rod 71 may drop downward past the edge of the rim 68, as shown in Figure 4. When this has been done, the upper end of the rod 71 no longer extends through the hole 66, and the lever 62 is then free to be moved to its other position. Thus a simple and effective interlocking mechanism has been provided of few parts, and not liable to get out of order, which effectually prevents the operator of the machine from making both drives effective simultaneously, either accidentally or on purpose.

In order to permit easy operation of the parts of the machine, the spindle 25 and other vertically moving parts may be counterweighted in the conventional manner. In this instance, an annular counter-weight 75, shown in Figure 1, surrounds the housing 24 and is connected to a cable 76 passing over a sheave 77, the other end of the cable being connected to a hook 78 attached to the top of the housing 53. The counter-weight 75 may have a groove 79 at one point thereof so as to provide clearance for the shaft 36.

The operation of the machine is as follows:—The gear box or other gearing connections (not shown) are adjusted to give the desired driving ratio between the revolutions of the work table and those of the shaft 31. The rotation of this shaft is transmitted to the driven sleeve 39, through the various connections described above. For all ordinary work, not requiring the extreme accuracy of the screw drive, the handle 62 is kept in the position shown in Figure 7, so that this drive is ineffective.

Assuming now that the tool carrier is at the top of its stroke, and that the operator desires to move it downward to make a cut, he closes the clutch 45, 46 by turning the hand wheel 48. The motion of the driven sleeve 39 is now transmitted through the clutch to the shaft 40, thus operating the rack and pinion feed. If he wishes to stop the motion of the tool carrier, he unscrews the hand wheel 48 slightly and pulls the clutch member 46 outwardly until it is out of contact with the member 45. In doing this, the position of the interlocking rod 71 is not affected, since the annular rim 68 is sufficiently wide so that the rod may still ride thereon when the member 46 is slightly separated from 45. In this position, the lip 68ª abuts against the rod 71 and prevents the member 46 from being accidentally pulled out so far that the rod drops down beside the rim 68.

When the tool carrier has reached the end of its downward travel, it may be returned to initial position by hand, by disengaging the clutch in the manner just described and then rotating the member 46 by means of the spokes fixed to the periphery thereof. This will turn the shaft 40 and drive the pinions 43 and 44 so as to elevate the tool carrier. The weight of the tool carrier is balanced by the counterweight 75, and therefore very little force is required to move it. Instead of returning the carrier by hand, however, the clutch may be left in engaged position if desired, and the usual quick-return (not shown) may be operated, thus returning the tool carrier by power.

If the operator desires to cut a screw thread or to perform any other operation requiring great accuracy, he unscrews the hand wheel 48 to the limit of its motion, and pulls the clutch member 46 all the way out, at the same time lifting the rod 71 slightly so that it will not catch on the lip 68ª. The rim 68 is then in the position shown in Figure 4, and the rod 71 may be lowered past the edge of this rim, to the position indicated in that figure. This lowering of the rod unlocks the handle or lever 62, which may now be shifted from the Figure 7 position to that shown in Figure 8, thus engaging the split nut 54, 55 with the screw 50. The tool carrier is then driven from the special screw drive, in the manner which has been explained in detail above. When the carrier has reached the bottom of its stroke, the handle 62 is moved back to the Figure 7 position, disengaging the drive. The member 46 may then be rotated by hand in the manner described above, to return the parts to their initial position for the next operation.

If it is desired to operate the rack and pinion feed again, after using the screw drive, the rod 71 is elevated and held up by hand while the clutch member 46 is shoved in far enough so that the rim 68 will support the rod. The clutch may then be opened or closed as often as desired, in the manner described above, without interference from the rod. Of course, the handle 62 must be in its disengaged or Figure 7 position before the rod 71 can be elevated.

While one embodiment of the invention has been disclosed, it is to be understood that the inventive idea may be carried out in a number of ways. This application is therefore not to be limited to the precise details shown, but is intended to cover all modifications thereof falling within the spirit of the invention or the scope of the appended claims.

I claim:

1. In a machine tool, the combination of a movable hollow tool carrier, a rack fixed on said carrier, a pinion meshing with said rack, means including a clutch for driving said pinion, a rotatable screw arranged within said carrier, mechanism mounted upon said carrier and movable from an ineffective position to a position in which it is effective to drive said carrier from the threads of said screw, an operating member at a fixed point on the machine for moving said mechanism, and a rod so arranged as to hold said operating member in its ineffective position when said clutch is closed, and to hold said clutch in its open position when said operating member is in its effective position.

2. In a machine tool, the combination of a movable tool carrier, a rack connected to said carrier, a pinion meshing with said rack, means for driving said pinion including an axially movable clutch member, an annular flange fixed to said clutch member, a rotatable screw parallel to said carrier, mechanism mounted upon said carrier and movable from an ineffective position to a position in which it is effective to establish a driving connection between said carrier and the threads of said screw, means for moving said mechanism from effective to ineffective position including a movable plate having an opening therein, and a longitudinally movable rod so positioned as to be in alinement with said opening when said plate is in a position to render said mechanism ineffective, said rod also being in alinement with said annular flange when said clutch is in its closed position, said plate, rod, and flange being so arranged that said rod must be inserted in said opening before said clutch may be closed and must be moved into the path of said flange before said plate may be moved.

3. In a machine tool, the combination of a longitudinally movable tool carrier, a rack carried by the tool carrier, a pinion engaging said rack, clutch-controlled operating means for the pinion, a rotating screw, split nut mechanism on the carrier for engagement with the screw, operating means for controlling the split nut mechanism including a vertically disposed oscillatory actuating shaft, gearing on the tool carrier slidable on said shaft vertically and operatively connecting the same with the split nut mechanism, an operating member on said vertical shaft, and interlocking means between said operating member and the clutch-controlled pinion driving means whereby to prevent operation of the tool carrier by the screw and pinion simultaneously.

4. In a machine tool, the combination of a movable tool carrier, rack and pinion means for moving said carrier at a rapid rate, means operable to render said rack and pinion means effective or ineffective, screw means for moving said carrier at a relatively slow rate of speed for cutting threads, means operable to render said screw means effective or ineffective, and a locking device for selective locking engagement with one or the other of said operable means when the latter are in inoperative position for rendering such means inoperable until the locking device is manually moved to its other position, one of said operable means being operable repeatedly and the other of said operable means being positively locked while the locking device is in a given locking position.

5. In a machine tool, the combination of a movable tool carrier, rack and pinion means for moving said carrier at a rapid rate, means operable to render said rack and pinion means effective or ineffective, screw means for moving said carrier at a relatively slow rate of speed for cutting threads, means operable to render said screw means effective or ineffective, and an interlocking device for selective locking engagement with one or the other of said operable means for rendering it inoperable while the other is repeatedly operable until the interlocking device is moved manually out of engagement with the inoperable means to render it operable and into locking engagement with the operable means to render it inoperable.

6. In a machine tool, the combination of a movable tool carrier, rack and pinion means for moving said carrier at a rapid rate, driving means for said pinion, a clutch comprising two relatively movable members for operatively connecting and disconnecting said driving means and pinion, screw means for moving said carrier independently of the rack and pinion at a relatively slow rate of speed for cutting threads, a lever for operatively connecting or disconnecting said screw means with the carrier, and a locking device positionable on the fixed member of the clutch and in the path of the movable clutch member to render the clutch inoperable and the lever operable, said locking device being movable manually into engagement with said lever when the lever is in position to disconnect the screw means from the carrier to render the lever inoperable and the movable clutch member operable, in which position the locking device is positionable on the movable clutch member.

In witness whereof, I have hereunto signed my name.

ALFRED TROSCH.